United States Patent [19]

Ohnishi

[11] 4,178,471
[45] Dec. 11, 1979

[54] LASER COMPUTER OUTPUT MICROFILMER WITH ELECTRICAL MISALIGNMENT CORRECTION

[75] Inventor: Masahiro Ohnishi, Asaka, Japan

[73] Assignee: Fuji Photo Film Co., Ltd., Minami-ashigara, Japan

[21] Appl. No.: 884,297

[22] Filed: Mar. 7, 1978

[30] Foreign Application Priority Data

Mar. 9, 1977 [JP] Japan .................................. 52/26415

[51] Int. Cl.² ........................ H04N 1/06; H04L 15/00
[52] U.S. Cl. ...................................... 178/15; 358/264
[58] Field of Search .................... 178/15, 30; 358/264, 358/289; 346/76 L; 340/324 AD, 794, 723, 724, 146.3 AC; 95/4.5

[56] References Cited

U.S. PATENT DOCUMENTS

| 3,441,672 | 4/1969 | Baldrich | 358/264 |
| 4,007,442 | 2/1977 | Findley et al. | 178/15 |
| 4,028,732 | 6/1977 | Salter et al. | 358/264 |
| 4,038,493 | 7/1977 | Richards | 178/15 |

Primary Examiner—Thomas A. Robinson
Attorney, Agent, or Firm—Sughrue, Rothwell, Mion, Zinn and Macpeak

[57] ABSTRACT

A laser computer output microfilmer wherein vertical and horizontal misalignment errors between the superimposed data character images and a format slide image are electrically corrected by appropriately incrementing or decrementing the presetting inputs of respective vertical and horizontal counters pulsed by line scan synchronizing and clock signals. This effectively shifts the projected data character frame by advancing or delaying the character generation start time and/or the line scan start time.

3 Claims, 5 Drawing Figures

LASER COMPUTER OUTPUT MICROFILMER WITH ELECTRICAL MISALIGNMENT CORRECTION

BACKGROUND OF THE INVENTION

This invention relates to a laser COM device in which the relative positions of character images formed by an intensity modulated laser scan and a separately projected format slide image superimposed on the character images on a recording medium can be electrically adjusted with high precision and resolution.

The term COM is an abbreviation for a Computer Output Microfilmer in which computer output data is optically superimposed on a format slide image having ruled lines or the like and recorded on a microfilm. In early COM devices the output data was displayed in the form of numerals or characters on a cathode ray tube, and an optical image thereof was formed on a silver salt film by a lens system. More recently, highly stable and low cost laser COM devices have been developed in which a laser instead of a cathode ray tube is employed as the light source. The laser beam is intensity modulated and deflected in two dimensions to scan a microfilm, thereby implementing recording. As compared with a cathode ray tube COM, the laser COM provides considerably higher brightness and energy output, whereby inexpensive recording materials having a relatively low sensitivity may be used. For example, Dry Silver and diazo films can be used, as well as a heat mode recording material such as thin metal film. The use of such recording materials also eliminates the troublesome wet development process.

As a COM device records very small images on a high density recording material, extremely high deflection accuracy is required. If the recorded image lies on the ruled lines of a format slide, reading is very difficult even if the image is greatly enlarged. The relative positions of the recorded image and the ruled lines must therefore be correctable so that they do not overlie one another.

In one method of deflecting the laser beam in a COM a device using electro-optical or acousto-optical effects is employed, which provides a very fast or high velocity deflection. This method is characterized by poor resolution and reduced brightness, however. A mechanical deflection device such as a rotary multi-surfaced mirror or a vibrating mirror is therefore commonly employed, but with such means the adjustment of the relative positions of the data image and the ruled line image is very difficult. Such relative position deviations may be corrected by finely moving the frame or base holder of the format slide using a micrometer, but the provision of such means is very expensive due to the degree of precision required. In addition, the image is liable to be affected by vibrations or the like during such fine adjustment.

SUMMARY OF THE INVENTION

An object of this invention is to provide a laser COM employing mechanical beam deflecting means in which deviations between the relative positions of the format slide image and the data image can be electrically corrected in two dimensions to an accuracy of one dot or character increment unit.

According to the invention such correction is implemented in a horizontal direction by providing a variable preset horizontal counter in which clock pulses generated in response to scan line synchronizing signals are counted, and after a preset count value has been reached character formation is initiated. By inrementing or decrementing the presetting value of the counter, the character generation start point can thus be horizontally shifted by a desired amount in either direction to thereby correct any data character-format line misalignment errors. A variable preset vertical counter is also provided, similarly fed by the scan line synchronizing signals, to implement the correction of data character-format line misalignment errors in the vertical direction. Thus, according to the invention the character forming clock pulse start time may be varied in single dot units within a given range in the horizontal direction, while the start time of a scan line carrying an effective data signal may be similarly varied in the vertical direction. The necessary or given ranges are determined by the number of dots used to form a character and by the number of dot spaces between adjacent characters, in both the vertical and horizontal directions.

DETAILED DESCRIPTION OF THE PREFERRED EMBODIMENT

Figure 1:
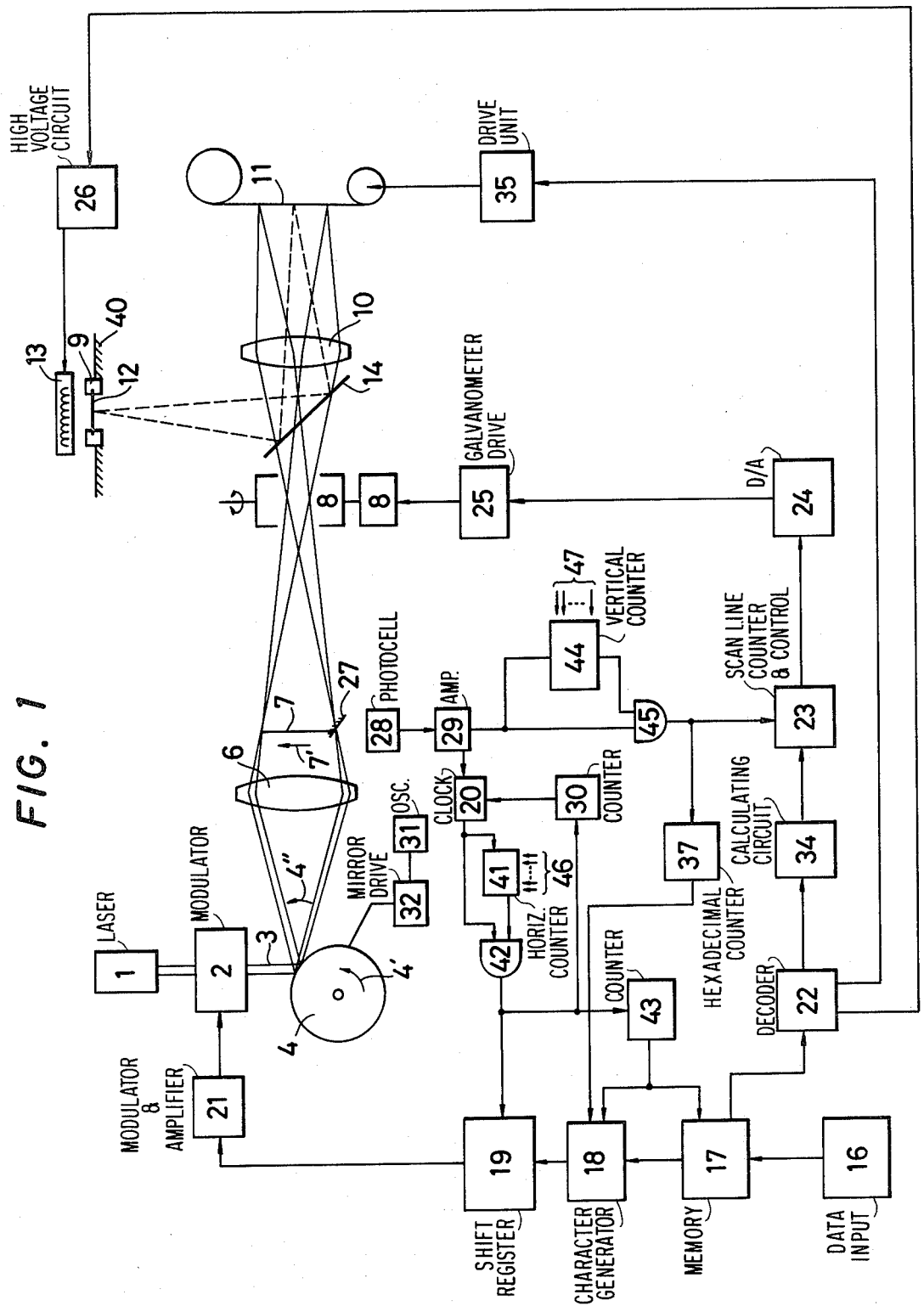
FIG. 1 shows a block diagram of an optical and electrical system of a laser COM device according to this invention.

Referring to FIG. 1, a light beam emitted by a laser device 1 is intensity modulated by an acousto-optical or an electro-optical modulator 2. The former is preferred because it has a superior extinction ratio and is more efficient. The intensity-modulated light beam 3 is unidimensionally deflected in the direction of arrow 4″ by a multi-surfaced mirror 4 which rotates in the direction of arrow 4′, and is focussed by a lens 6 to form a scanning line 7 in the direction of arrow 7′. The light beam is thereafter applied to a vibrating mirror 8 where it is deflected in a direction perpendicular to the deflection direction of the rotary mirror 4, passed through a half mirror 14, and focussed by a lens 10 into a minute optical point on a strip of recording material 11, thus implementing a two-dimensional scan on the latter. The multi-surfaced mirror 4 is rotated by the combination of an oscillator 31 and a drive circuit 32. A format slide 12 is mounted in a frame 9 fixedly secured to a holding plate 40. The slide 12 is illuminated by a flash lamp 13, and the image thereof is reflected by the half mirror 14 through the lens 10 and focussed on the recording strip, thus optically superimposing it on the data image formed by the laser beam scan.

The electrical system modulates the two-dimensionally scanned optical point to form a character signal on the recording strip 11. The output signal from a data input device 16, such as a computer, a magnetic tape unit, etc. is stored in a one frame memory device 17, passed through a character generator 18, and then subjected to series-parallel conversion by a shift register 19 controlled by a clock pulse generator 20 to produce a time series mode video signal. This signal is amplitude-modulated by a high-frequency (110 MHz in this embodiment) carrier wave by a modulator and amplifier unit 21, and is then power amplified and applied to the optical modulator 2. The laser beam is thus modulated in a time series mode by the optical modulator 2, and therefore its two-dimensional scan on the strip 11 records the contained information.

Various methods by which the intensity-modulated light beams are time synchronized on the recording strip so that the information is properly recorded will now be described. An instruction signal stored in the memory device 17 is fed to a decoder 22 whose output controls the vibrating mirror 8 through a calculating circuit 34, a scan line counter and control device 23, a digital-to-analog (D/A) converter 24, and a galvanometer drive unit 25. The flash lamp 13 is also controlled by the output of the decoder 22 through a high voltage circuit 26, while the frame feed of the film or recording strip is controlled by the output of the decoder 22 through a drive unit 35.

To synchronize the scan lines on the recording strip 11 a stationary mirror 27 having a knife edge is positioned in the vicinity of the start point of the scan line 7. At the start time of each scan the light beam from a surface of the rotary mirror 4 is reflected by the mirror 27 onto a photocell 28, whose output is amplified by an amplifier 29 and employed as a synchronizing signal for each surface of the mirror 4. The trailing edge of this synchronizing signal triggers pulse generator 20 to form high-frequency clock pulses, which are applied to both a horizontal counter 41 which can be externally preset via input terminals 46, and to an AND gate 42. When the counter 41 reaches its preset value and AND gate 42 is opened, the next clock pulse passes therethrough and is fed back to a clock pulse counter 30. After the latter registers the number of pulses necessary to form a character row it suspends the operation of the clock pulse generator 20. In the example described herein one character is formed by seven dots in a horizontal direction and nine dots in a vertical direction, while the space between adjacent characters is formed by three dots in a horizontal direction and seven dots in a vertical direction. The operation of the pulse generator 20 is therefore suspended after the counter 30 counts 1320 clock pulses (10 dots per character × 123 characters per row) required for each horizontal scan. As a result, velocity fluctuations and angle division errors of the rotary mirror 4 can be corrected, as disclosed in Japanese Patent Application No. 24786/1976. The clock pulse output from AND gate 42 is also applied to the shift register 19 and to a decimal counter 43. Whenever the counter 43 counts up to ten the next character is read out of the memory 17.

Figure 2A:
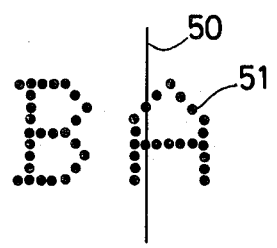
FIGS. 2a-3b show examples of the relative positional relationships between format slide lines and data characters in horizontal and vertical modes, respectively.
Figure 2B:
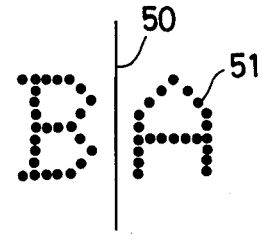

The operation of the horizontal preset counter 41 will now be described with respect to a horizontal deviation in the relative positions between the format slide image and data characters. FIG 2(a) shows a state where a data character 51 lies on a vertical line 50 projected by the format slide. In this case the character 51 is relatively shifted in a horizontal direction by three dots. Accordingly, correction can be accomplished by adding three to the value applied by the presetting input terminals 46 to the counter 41. That is, of the clock pulses supplied by the generator 20 triggered by the trailing edge of the synchronizing signal, the clock pulses actually contributing to the formation of the character are delayed by three clock pulses. As a result the characters are shifted to the right as seen in FIG. 2(b) by three dots, whereby the line 50 is correctly disposed between the data characters.

The synchronizing signal supplied by the amplifier 29 is also applied to a vertical counter 44 having external presetting terminals 47. When the counter 44 reaches its preset value an AND gate 45 is opened, the synchronizing signal passed therethrough steps the scan line counter and control circuit 23, and a line section pulse is applied to a hexadecimal counter 37 for character generation. The circuit 23 applies its count value to the D/A converter 24 to thereby form a staircase waveform.

In the disclosed embodiment the mirror 4 has twenty-four surfaces and is rotated at a constant velocity of 10,660 r.p.m., whereby 10,660×24 lines are scanned per minute, or 4,264 lines per second. The staircase waveform generated by the D/A converter 24 causes the drive circuit 25 to steppingly deflect the mirror 8 to thereby vertically deflect the light beam. The staircase waveform also has a frequency of about 4.2 KHz, and the inertia of the mirror acts to smooth out any minor frequency variations and produce a smooth sweep. The scan line counter in circuit 23 resets at the end of each complete frame sweep, which returns the staircase waveform and the mirror 8 to "zero" positions to begin the next frame.

Figure 3A:
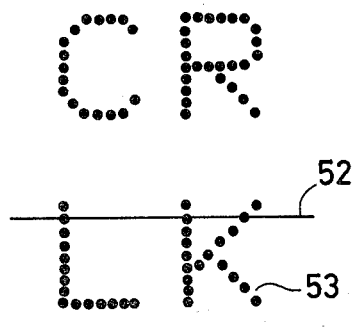
Figure 3B:
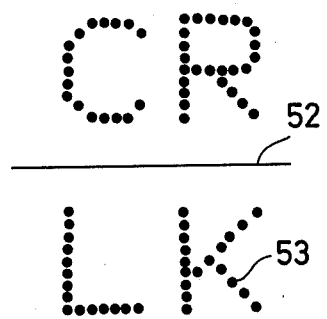

The operation of the vertical preset counter 44 will now be described with respect to a vertical deviation in the relative positions between the format slide image and the data characters. FIG. 3(a) shows a state where a data character 53 lies on a horizontal line 52 projected by the format slide. The data character 53 is relatively shifted by four or five dots in a vertical direction, and correction can thus be accomplished by adding four or five to the value applied by the presetting input terminals 47 to the vertical counter 44. As a result, after four or five synchronizing signals are generated, as at the beginning of each line 7, a scan line carrying the actual data is produced. That is, the scan line data is shifted downward by four or five dots as shown in FIG. 3(b) to correct the deviation, whereby the horizontal line 52 properly lies between the data characters "CR" and "LK".

A data deviation in the vertical direction can also be finely adjusted by applying a DC voltage to the vibrating mirror drive circuit 25 in an analog mode. This method is disadvantageous, however, in that the circuit may become unstable due to drift, etc., and compensating features involve rather intricate circuit designs.

What is claimed is:

1. In a laser computer output microfilmer including means for two dimensionally scanning an intensity modulated laser beam to generate a data character image on a recording medium and means for superimposing a projected format slide image over the data character image, means for correcting horizontal and vertical misalignments between the relative positions of the data character and format slide images, characterized by:
   (a) means for generating scan line synchronizing signals,
   (b) means for generating clock pulses in response to said synchronizing signals,
   (c) a first variable preset counter for counting said clock pulses, including means for presetting said counter,
   (d) means for initiating the data character image formation in response to said first counter reaching its preset value, (e) a second variable preset counter for counting said synchronizing signals, including means for presetting said second counter, and (f) means for initiating an effective scan line in response to said second counter reaching its preset value, whereby the data character image may be shifted horizontally and/or vertically with respect to the format slide image in a desired direction and by a desired amount by appropriately incrementing or decrementing the preset values of said first and second counters.

2. A laser computer output microfilmer as defined in claim 1, further comprising means for suspending the operation of the clock pulse generating means after a predetermined number of clock pulses have been generated following the first counter reaching its preset value.

3. A laser computer output microfilmer as defined in claims 1 or 2, wherein the effective scan line initiating means comprises a deflection mirror successively and intermittently rotated in predetermined increments in response to a staircase waveform, and means for controlling the stepping point of said waveform.

* * * * *